United States Patent
Ikeda

(10) Patent No.: US 10,454,959 B2
(45) Date of Patent: Oct. 22, 2019

(54) IMPORTANCE-LEVEL CALCULATION DEVICE, OUTPUT DEVICE, AND RECORDING MEDIUM IN WHICH COMPUTER PROGRAM IS STORED

(71) Applicant: NEC Corporation, Minato-ku, Tokyo (JP)

(72) Inventor: Satoshi Ikeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 212 days.

(21) Appl. No.: 15/532,171

(22) PCT Filed: Dec. 8, 2015

(86) PCT No.: PCT/JP2015/006117
§ 371 (c)(1),
(2) Date: Jun. 1, 2017

(87) PCT Pub. No.: WO2016/092834
PCT Pub. Date: Jun. 16, 2016

(65) Prior Publication Data
US 2017/0272457 A1  Sep. 21, 2017

(30) Foreign Application Priority Data
Dec. 10, 2014  (JP) ................................ 2014-249566

(51) Int. Cl.
*H04L 29/06* (2006.01)
*G06F 21/55* (2013.01)

(52) U.S. Cl.
CPC .......... *H04L 63/1425* (2013.01); *G06F 21/55* (2013.01); *G06F 21/552* (2013.01); *H04L 63/02* (2013.01)

(58) Field of Classification Search
CPC ............. H04L 63/1416; H04L 63/1408; H04L 63/1441; H04L 63/1458
(Continued)

(56) References Cited

U.S. PATENT DOCUMENTS

| 2009/0024555 A1* | 1/2009 | Rieck ........................ G06F 7/02 706/54 |
| 2011/0035802 A1* | 2/2011 | Arajujo, Jr. ........... G06F 11/079 726/23 |
| 2012/0054860 A1* | 3/2012 | Wyschogrod ..... H04L 29/12066 726/22 |

FOREIGN PATENT DOCUMENTS

| JP | 2004-234401 A | 8/2004 |
| JP | 4619254 B2 | 1/2011 |
| WO | 2014/045827 A1 | 3/2014 |

OTHER PUBLICATIONS

International Search Report for PCT Application No. PCT/JP2015/006117, dated Jan. 19, 2016.
(Continued)

*Primary Examiner* — Evans Desrosiers

(57) ABSTRACT

The present invention provides an importance-level calculation device, etc., with which it is possible to present an alert indicating network abnormality to an operator so as to enable the operator to determine the alert more efficiently. An importance-level calculation device is provided with an importance-level calculation unit which, when a first alert is notified in response to detection of an abnormality in a communication network to be monitored, computes an importance level of the first alert, based on a characteristic that is included in communication information that has caused the first alert but is not included in communication information related to one or more second alerts having been notified prior to the first alert.

6 Claims, 14 Drawing Sheets

(58) Field of Classification Search
USPC .......................................................... 726/23
See application file for complete search history.

(56) References Cited

OTHER PUBLICATIONS

English translation of Written opinion for PCT Application No. PCT/JP2015/006117.

* cited by examiner

Fig. 8

DETECTED ALERT LIST 61

| DETECTION TIME | TRANSMISSION SOURCE IP | TRANSMISSION DESTINATION IP | DETECTION RULE NAME | IMPORTANCE LEVEL |
|---|---|---|---|---|
| 09:00:12 | 192.168.0.1 | 10.1.0.1 | portscan | 0.05 |
| 09:00:13 | 192.168.0.2 | 10.1.0.1 | portscan | 0.00 |
| 09:10:30 | 192.168.0.3 | 10.1.0.2 | directory traversal | 0.05 |
| 09:11:10 | 192.168.0.3 | 10.1.0.3 | directory traversal | 0.05 |
| 10:15:01 | 192.168.0.5 | 10.1.0.3 | directory traversal | 0.75 |
|  |  |  |  |  |
|  |  |  |  |  |

IMPORTANCE-LEVEL CALCULATION DEVICE, OUTPUT DEVICE, AND RECORDING MEDIUM IN WHICH COMPUTER PROGRAM IS STORED

This application is a National Stage Entry of PCT/JP2015/006117 filed on Dec. 8, 2015, which claims priority from Japanese Patent Application 2014-249566 filed on Dec. 10, 2014, the contents of all of which are incorporated herein by reference, in their entirety.

TECHNICAL FIELD

The present invention relates to a technical field of monitoring a network to be monitored.

BACKGROUND ART

For preventing, for example, attacks from external communication networks or malicious third parties' unauthorized entries, a company network shuts down or monitors communications by means of firewalls and intrusion detection systems. In the following explanation of the present application, "communication network" may be simply expressed as "network." In addition, in the following explanation, "unauthorized entry detection system" may be expressed as "IDS (intrusion detection system)."

Particularly in recent years, cases of targeted attacks aiming to steal information on intellectual property or confidential information of companies have been on the increase. In response, the demand for cyber security is increasing.

A general cyber security measure is to monitor the network to be monitored or address incidents by introducing a security operation center. In the following explanation, "security operation center" may be expressed as "SOC (security operation center)." For example, companies organize the SOC internally, or realize the SOC by outsourcing the operation of the SOC to outside companies.

More specifically, in an operation to monitor the network, the operation to classify an alert notified by a monitoring device such as a firewall or an IDS performs classification operations according to predetermined levels of risk is performed. Alerts include such an alert that indicates an attack from outside, alternatively include one which does not have any risk, for example. That is, not all alerts notified by the monitoring devices are required to be reported as incidents. Therefore, an operator who performs a monitoring operation confirms information included in the alert or refers to outside information. Then, the operator sets an appropriate risk level to the alert. The operator can report the alert as an incident if necessary. The alert information referred to in this classification operation includes the following information, for example. That is, the alert information includes a detection rule used in detecting abnormalities of the monitoring target, IP addresses and port numbers of hosts having performed transmission and reception, and information representing an importance level assigned to the detection rule by a security vendor. Note that "IP" is an abbreviated expression of "Internet protocol."

PTL 1 is an example related art disclosed before the present application. PTL 1 analyzes event data (alert information) notified by the IDS sensor provided on the network to be monitored. In this way, PTL 1 discloses a technique related to a system for analyzing an event and giving a warning to issue an alert.

This event analysis and warning system mechanically determines whether a communication event which is indicated by event data is an unauthorized access, based on the event data and the alert having been determined as indicating an unauthorized access in the past. More specifically, the event analysis and warning system compares a part or all of the items of the signature (detection rule), the IP address, and the port number included in the event data, with the alert having been determined as indicating the unauthorized access in the past. As a result, the event analysis and warning system determines whether the communication event is the unauthorized access, based on whether each of the items matches or is similar to the alert having been determined as indicating the unauthorized access.

CITATION LIST

Patent Literature

[PTL 1] Japanese Patent No. 4619254

SUMMARY OF INVENTION

Technical Problem

As described above, the communication monitoring system can assist operators' classification operation by analyzing typical items included in the alert. However, for an element having an atypical structure such as a payload included in a packet having caused the alert, the communication monitoring system requires visual inspection by the operator to determine the level of risk of the alert.

In addition, PTL 1 describes determining whether the communication event is the unauthorized access on the basis of the event data and the alert having been determined as indicating the unauthorized access in the past. However, in some cases, it is not sufficient to use whether event data matches or is similar to the alert, as a determination criterion in classifying alerts.

In the following explanation, the alert having been classified in the past is assumed to be the alert having been classified as false detection, for example. In addition, the alert having been classified in the past is assumed to be classified on the basis of the detection rule and information representing the transmission source and the transmission destination of the communication event. In this case, according to the technique disclosed in PTL 1, even when those items related to the alert having been classified in the past matches those items related to the newly notified alert, it is not always possible to classify the newly notified alert as a false detection as well. That is, as the detection criterion, it is not sufficient to use the detection rule and information representing the transmission source and the transmission destination of the communication event.

In the following explanation, for facilitating the explanation, the communication monitoring system including the IDS is explained as an example. For example, in an operation to classify the alert, if the payload contained in the communication packet having been detected as an abnormality is not confirmed, the operator may not be able to make a final determination on the level of risk of the alert. More specifically, the communication monitoring system may assist the operator's classification operation by analyzing typical items included in an alert. However, for an element having an atypical structure such as the payload, the communication monitoring system requires visual inspection of the operator to determine the level of risk of the alert.

A main example objective of the present invention is to provide an importance-level calculation device and the like that can output to an operator an alert indicating an abnormality of a network, in a manner by which more efficient determination is possible.

Solution to Problem

So as to solve the above-stated problem, an importance-level calculation device according to an aspect of the present invention includes:

importance-level calculation means for computing, when a first alert is notified in response to detection of an abnormality in a communication network to be monitored, an importance level of the first alert, based on a characteristic that is included in communication information that has caused the first alert but is not included in communication information related to one or more second alerts having been notified prior to the first alert.

So as to solve the above-stated problem, an output device according to an aspect of the present invention includes:

output means for outputting at least any of an importance level computed by the importance-level calculation device as set forth in any one of Claims 1 to 6, and a part or all of the alert information related to the alert, in a mode in which an operator can identify it.

This objective can also be achieved by a communication monitoring system including the above-described importance-level calculation device.

In addition, so as to achieve this objective, an importance-level calculation method according to an aspect of the present invention obtains, when a first alert is notified in response to detection of an abnormality in a communication network to be monitored, an importance level of the first alert, based on a characteristic that is included in communication information that has caused the first alert but is not included in communication information related to one or more second alerts having been notified prior to the first alert.

Note that this objective can also be achieved by a computer program that realizes the importance-level calculation device having each of the above-described configurations and the method therefor by using a computer, and a computer-readable recording medium storing therein the computer program.

Advantageous Effects of Invention

The present invention can provide an importance-level calculation device and the like that can output to an operator an alert indicating an abnormality of a network in a manner by which more efficient determination is possible.

BRIEF DESCRIPTION OF DRAWINGS

FIG. 8 is a diagram specifically illustrating a mode in which information related to an alert is presented by an output device according to the second example embodiment of the present invention.

DESCRIPTION OF EMBODIMENTS

Figure 1:
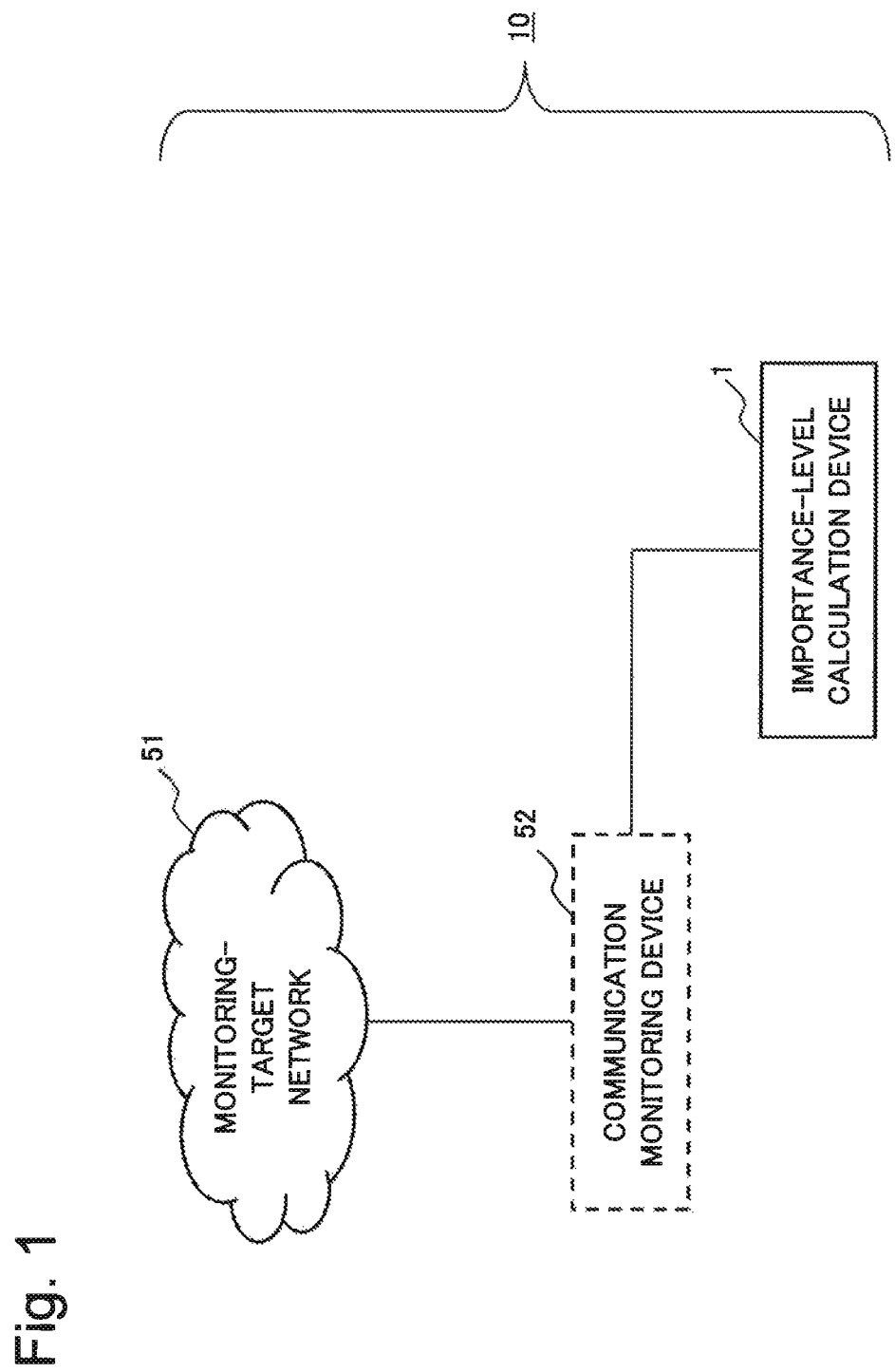
FIG. 1 is a block diagram illustrating a configuration of a communication monitoring system according to a first example embodiment of the present invention.

The following explains in detail the example embodiments of the present invention by referring to the drawings.

First Example Embodiment

Figure 2:
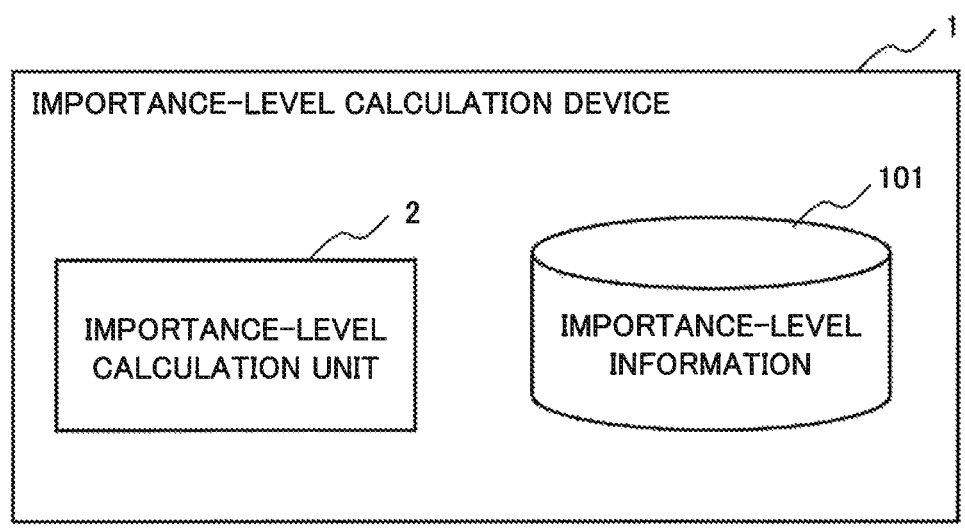
FIG. 2 is a block diagram illustrating a configuration of an importance-level calculation device according to the first example embodiment of the present invention.

FIG. 1 is a block diagram illustrating a configuration of a communication monitoring system 10 according to a first example embodiment of the present invention. FIG. 2 is a block diagram illustrating a configuration of an importance-level calculation device 1 according to the first example embodiment of the present invention.

In FIG. 1, the communication monitoring system 10 broadly includes the importance-level calculation device 1, a monitoring-target network 51 that is to be monitored, and a communication monitoring device 52 that monitors the monitoring-target network 51. In FIG. 2, the importance-level calculation device 1 includes an importance-level calculation unit 2.

More specifically, the importance-level calculation unit 2 has a function of computing, when an alert (first alert) is notified in response to detection of an abnormality in the monitoring-target network 51 to be monitored, an importance level of a first alert based on communication information that has caused the first alert. That is, the importance-level calculation unit 2 computes the importance level based on a characteristic that is included in the communication information but is not included in communication information related to one or more alerts (second alert) having been notified prior to the first alert.

The importance-level calculation unit 2 also has a function of storing, as importance-level information 101, the computed importance level and the alert identifier from which the first alert is identifiable, in association with each other. Note that the operation process performed by the importance-level calculation unit 2 to compute the importance level will be explained later in detail in the present example embodiment.

The importance-level information 101 is assumed to be stored in a storage device not illustrated in the drawing, for example. The importance-level information 101 is also assumed to include information which includes the importance level computed by the importance-level calculation unit 2 and the alert identifier from which the first alert is identifiable, and the importance level and the alert identifier are associated with each other.

In the following explanation, for facilitating the explanation, the "monitoring-target network 51" may be simply referred to as the "network 51". In addition, in the following explanation, the "first alert" and the "second alert" may be collectively referred to as "alert" (hereinafter, the same applies to each example embodiment).

The communication monitoring device 52 has a function of monitoring communication information flowing through the network 51. In addition, the communication monitoring device 52, on the basis of the detection rule, detects attacks that are from outside and are directed to the network 51, for example. The communication monitoring device 52 notifies the importance-level calculation device 1 as an alert indicating a newly detected abnormality. The communication monitoring device 52 has a function of storing alert information related to the alert.

The above-described alert includes, for example, a detection time, an identifier that can identify the detection rule used in detecting the abnormality, an IP address and a port number of a transmission source of communication information that has caused the abnormality, and an IP address and a port number of a transmission destination host of the communication information. The detection time is information representing a time at which the communication monitoring device 52 detected the abnormality. Or, the detection time may be information representing a date and time including a time at which the communication monitoring device 52 detected the abnormality. For facilitating the explanation, in the following explanation, even information representing the date and time including that time is expressed as "detection time."

The above-described alert is information generated based on information included in the alert and the identifier (alert identifier) that can identify the alert.

More specifically, alert information is assumed to include at least the following information for each alert, for example.

Alert identifier
Detection time,
Identifier that can identify the detection rule
IP address and port number of the transmission source of communication information that has caused the abnormality
IP address and port number of the transmission destination host of the communication information.

That is, the alert information is information in which the detection time, the identifier of the detection rule, the IP address and the port number of the transmission source, the IP address and the port number of the transmission destination host are associated with each other, by using the alert identifier as a key.

In the following explanation, for facilitating the explanation, a configuration of using an IDS (intrusion detection system) as the communication monitoring device 52 is used as an example. However, the example embodiment of the present invention is not limited to the described configuration. The communication monitoring device 52 detects the abnormality in the network 51 or the attack directed to the network 51. The communication monitoring device 52 notifies the detected attack as the alert. The communication monitoring device 52 may adopt a configuration of using a communication monitoring device that can store, as an evidence, the alert together with information associated with identification information (ID) representing the detected attack.

Any currently common technology may be adopted as a technology of the communication monitoring device 52 to detect an abnormality of the network 51 on the basis of the detection rule. Therefore, the detailed explanation of the technology is omitted in the present example embodiment (hereinafter, the same applies to each example embodiment).

In the following explanation, the operation of the importance-level calculation device 1 according to the present example embodiment to perform operation process of importance levels and to store the appearance information is explained in greater detail.

(Importance-Level Operation Process)

In the following explanation, the operation of the importance-level calculation device 1 according to the present example embodiment to perform operation process of importance levels is explained with reference to FIG. 3.

Figure 3:
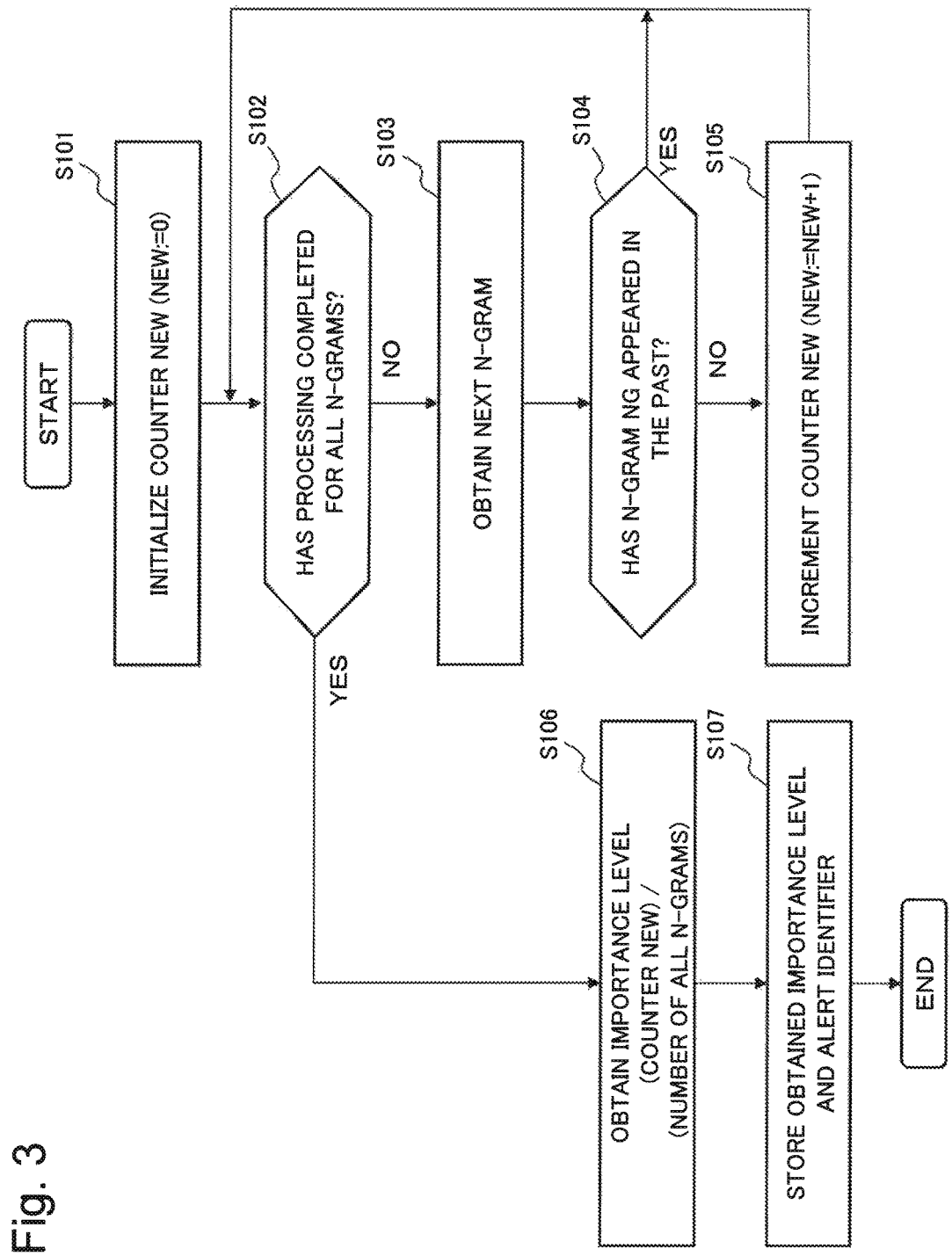
FIG. 3 is flowchart representing operation process of an importance level, which is performed by the importance-level calculation device according to the first example embodiment of the present invention.

FIG. 3 is flowchart representing operation process of the importance level, which is performed by the importance-level calculation device 1 according to the first example embodiment of the present invention. The operational procedure performed by the importance-level calculation device 1 is explained according to the flowchart.

In the present example embodiment, for facilitating the explanation, the importance-level calculation unit 2 is assumed to determine the importance level based on communication information (e.g., a communication packet) that has caused the first alert, when the first alert is notified as described above, as an example. That is, the importance-level calculation unit 2 is assumed to perform operation based on the information constituting the communication information (e.g., a payload of the communication packet) and according to the flowchart illustrated in FIG. 3.

For facilitating the explanation, the importance-level calculation device 1 will be explained by way of the above-described configuration. However, the present invention explained by way of the present example embodiment is not limited to the above-described configuration (hereinafter, the same applies to the following example embodiments).

For all the N-grams (first N-gram) included in the communication information, the importance-level calculation unit 2 determines whether the N-gram (second N-gram) that is the same as the first N-gram having appeared in the past. Based on the determination result, the importance-level calculation unit 2 computes the importance level of the alert. That is, the importance-level calculation unit 2 computes the importance levels of all the first N-grams included in the payload of the communication packet.

In the present application, "N-gram" is a character string in which any "n" consecutive characters included in a payload, for example.

More specifically, the importance-level calculation unit 2 first initializes the N-gram number counter NEW to set the value "0" in the counter (Step S101).

The importance-level calculation unit 2 performs the following process for all the first N-grams included in the payload. That is, the importance-level calculation unit 2 determines whether the appearance determination process described in Steps S103 to S105 is complete for all the first N-grams included in the payload (Step S102).

If determining that the process for all the first N-grams is not complete, the importance-level calculation unit 2 advances the process to Step S103 ("NO" in Step S102). The importance-level calculation unit 2 obtains the first N-gram to be processed next. That is, the importance-level calculation unit 2 obtains the N-gram (NG) to be processed next (Step S103). However, "to obtain" used in the above also means to extract or to take out (hereinafter, the same applies to the following example embodiments).

The importance-level calculation unit 2 determines whether the first N-gram is the same as a second N-gram having appeared in the past (Step S104). More specifically, the importance-level calculation unit 2 refers to appearance information described later, based on the obtained first N-gram (e.g., appearance information 102 illustrated in FIG. 10) for example. By doing so, the importance-level calculation unit 2 may determine whether the first N-gram is the same as the second N-gram having appeared in the past. That is, the importance-level calculation unit 2 may determine that the first N-gram is the N-gram appeared in the past, when the appearance information includes the second N-gram as a result of the reference.

As a result of the determination, if it is determined that the second N-gram that is the same as the first N-gram having appeared in the past, the importance-level calculation unit 2 proceeds to the process for the first N-gram to be processed next. That is, the importance-level calculation unit 2 returns the process to Step S102 ("YES" in Step S104).

As a result of the determination, if it is determined that the first N-gram is not the same as the second N-gram appeared in the past, the importance-level calculation unit 2 proceeds the process to Step S105 ("NO" in Step S104).

The importance-level calculation unit 2 increments the value of the counter NEW. In addition, the importance-level calculation unit 2 proceeds to the process for the first N-gram to be processed next. That is, the importance-level calculation unit 2 returns the process to Step S102 (Step S105).

When the process for all the first N-grams is determined to be complete in Step S102, the importance-level calculation unit 2 advances the process to Step S106 ("YES" in Step S102).

The importance-level calculation unit 2 computes the importance level. That is, the importance-level calculation unit 2 calculates the importance level. The importance-level calculation unit 2 computes the importance level X1 according to the following expression (1) (Step S106). That is, $$X1 = (\text{Counter NEW})/(\text{The number of all the N-grams}) \quad (1)$$

Here, "/" represents division (hereinafter, the same applies to each example embodiment).

The importance-level calculation unit 2 stores, in the importance-level information 101, the computed importance level and the alert identifier from which the first alert is identifiable, in association with each other (Step S107). In that case, the importance-level calculation unit 2 is assumed to compute the alert identifier from the alert information. The importance-level calculation unit 2 may adopt a configuration of storing, as the importance-level information 101, the importance level and the computed alert identifier in association with each other.

In this way, the importance-level calculation unit 2 can obtain an importance level based on the payload included in the communication packet that has caused the abnormality. In addition, it is possible to adopt a configuration of outputting the computed importance level to the operator using the communication monitoring system 10, by including the computed importance level in the output device not illustrated in the drawing (e.g., the output device 22 illustrated in FIG. 5) and electronic mail, for example. Alternatively, the computed importance level may at least be displayed by means of output means (not illustrated in the drawings) being a user interface such as a display included in the device itself. For facilitating the explanation, the above-described configuration is taken as an example in the explanation. However, the present invention explained by way of the present example embodiment is not limited to the above-described configuration. That is, any configuration may be adopted as long as it can present the computed importance level in a mode in which the operator can classify the alerts easily.

Accordingly, the operator can determine the level of risk of the alert, based on the originality (novelty) of the payload.

The originality represents a mode in which no second N-gram that is the same as the first N-gram having appeared in the past, for example.

(Process to Store Appearance Information)

Next in the following explanation, the operation of the importance-level calculation device 1 to store the appearance information on the appearance of N-grams is explained, with reference to FIG. 4. That is, the importance-level calculation unit 2 stores appearance information on the appearance of all the N-grams included in the payload, according to the flowchart illustrated in FIG. 4.

Figure 4:
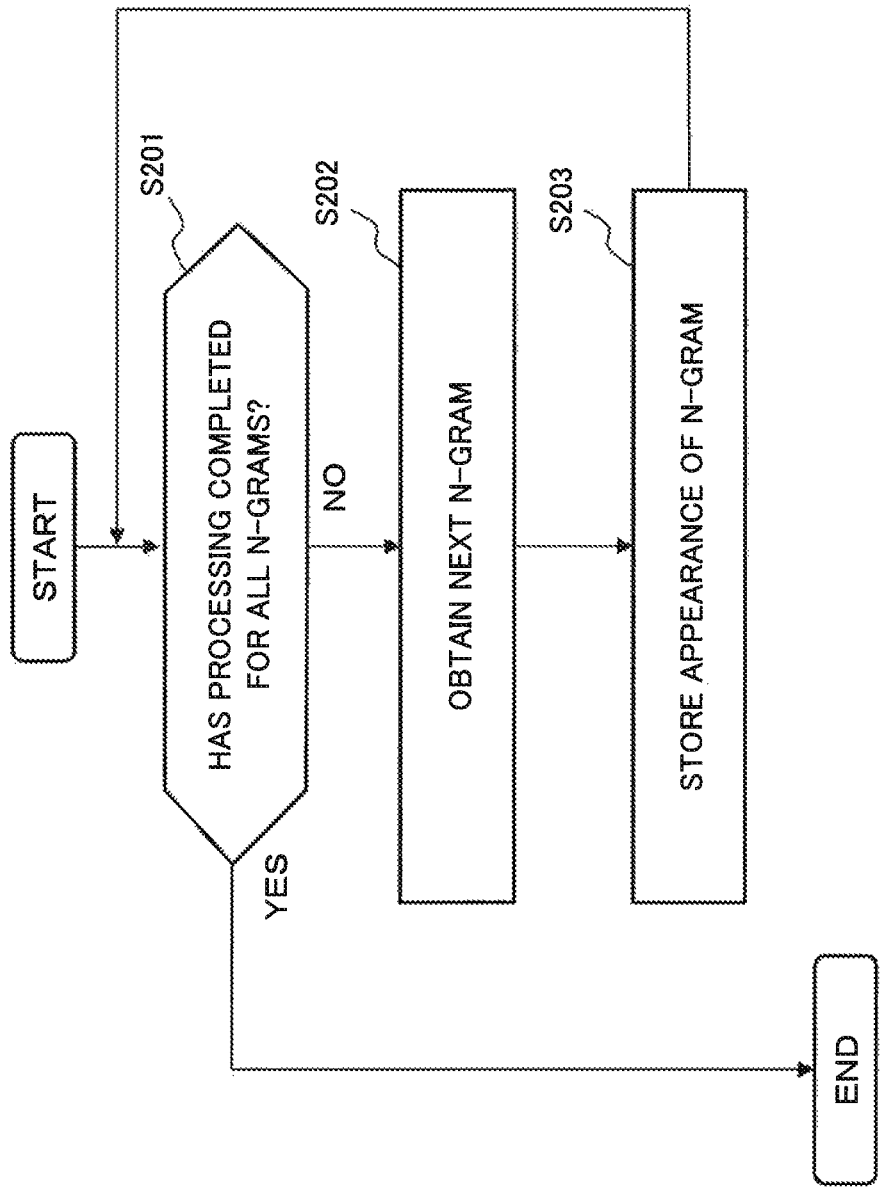
FIG. 4 is a flowchart representing an operation of storing appearance information on appearance of N-grams, which is performed by the importance-level calculation device according to the first example embodiment of the present invention.

FIG. 4 is a flowchart representing an operation of storing appearance information on the appearance of N-grams. The operation is performed by the importance-level calculation device 1 according to the first example embodiment of the present invention. According to this flowchart, the operational procedure of the importance-level calculation device 1 is explained.

The importance-level calculation unit 2 determines whether the process to store the appearance information on the appearance of all the first N-grams included in the payload is complete (Step S201).

When the process for all the first N-grams is determined to be complete, the importance-level calculation unit 2 ends the process ("YES" in Step S201).

On the other hand, when the process for all the first N-grams is determined to be incomplete, the importance-level calculation unit 2 advances the process to Step S202 ("NO" in Step S201). The importance-level calculation unit 2 obtains the first N-grams to be processed next (Step S202). The importance-level calculation unit 2 stores the appearance information for the obtained first N-gram (Step S203).

Here, the importance-level calculation unit 2 is assumed to store the first N-gram having appeared, as the appearance information to be stored. In addition, the importance-level calculation unit 2 may adopt a configuration of storing the appearance information in a storage device (not illustrated in the drawings) included in importance-level calculation device 1.

In the above-described present example embodiment, for facilitating the explanation, Step S104 and Step S203 performed by the importance-level calculation unit 2 are explained using a configuration of executing the process independent on the detection rules. However, the present example embodiment of the present invention is not limited to this configuration. The importance-level calculation unit 2 may adopt a configuration of determining whether the N-gram that is the same as the first N-gram having appeared in the past in Step S104, for each detection rule. Alternatively, the importance-level calculation unit 2 may adopt a configuration of storing the appearance information in Step S203, for each detection rule. In that case, the importance-level calculation unit 2 is assumed to refer to the alert information, and to execute process illustrated in Step S104 and Step S203 for each identifier of the detection rule included in the alert information. Accordingly, the importance-level calculation unit 2 can easily realize the above-described process.

When the communication protocol adopted by the network 51 is clearly known, the importance-level calculation unit 2 may adopt a configuration of executing the following process. That is, the importance-level calculation unit 2 may determine whether the second N-gram that is the same as the first N-gram have appeared in the past in Step S104, for each type of communication protocol. Alternatively, the importance-level calculation unit 2 may store appearance information for each type of communication protocol, in Step S203. In that case, the importance-level calculation unit 2 refers to alert information, and determines the type of communication protocol on the basis of the port number included in the alert information. Alternatively, the importance-level calculation unit 2 may determine the type of communication protocol on the basis of the detection rule associated with the identifier of the detection rule. According to the above processes, the importance-level calculation unit 2 can easily realize the above-described process.

In the above-described present example embodiment, for facilitating the explanation, the importance-level calculation unit 2 is explained by taking an example of a configuration of calculating the importance level based on the payload included in an IP packet. However, the example embodiment of the present invention is not limited to the described configuration. The importance-level calculation unit 2 may adopt a configuration of calculating the importance level based on any binary string included in the IP packet. Alternatively, if using a web application firewall as the communication monitoring device, the importance-level calculation unit 2 may adopt a configuration of calculating the importance level based on the following information. That is, the importance-level calculation unit 2 may calculate the importance level based on the entirety of an HTTP (Hypertext Transport Protocol) request message or an HTTP response message. Alternatively, the importance-level calculation unit 2 may calculate an importance level based on the HTTP header portion or body portion, on condition that the HTTP request message or the HTTP response message are obtainable (hereinafter, the same applies to each example embodiment).

In this manner, the importance-level calculation unit 2 according to the present example embodiment can output the alert indicating the abnormality of the network to the operator in the manner in which the alert can be determined more efficiently. The reason for this is stated as follows.

That is, the importance-level calculation device 1 includes the importance-level calculation unit 2 capable of computing the importance level of the alert based on information included in the communication information that has caused the alert. Accordingly, the operator can easily determine the level of risk of the alert, based on that importance level. Accordingly, even when the level of risk cannot be determined solely by such information as the detection rule and the IP address of the host, the importance-level calculation device 1 can present to the operator the importance level as a classification guidepost. For the stated reason, the operator can efficiently determine the level of risk in the operation to classify alerts. In particular, the importance-level calculation device 1 can obtain the ratio of the newly appeared N-grams as the importance level. Therefore, the operator can easily determine whether it is the alert that has the characteristic not having appeared in the past.

Second Example Embodiment

Next, a second example embodiment based on the importance-level calculation device 1 according to the above-described first example embodiment of the present invention is explained. In the following explanation, the characteristic portions of the present example embodiment are mainly explained. In the following explanation, each configuration that is similar to the corresponding configuration of the above-described example embodiments is assigned the same reference number, and the overlapping explanation is omitted.

The communication monitoring system 20 according to the second example embodiment of the present invention is explained with reference to FIG. 5 to FIG. 8.

Figure 5:
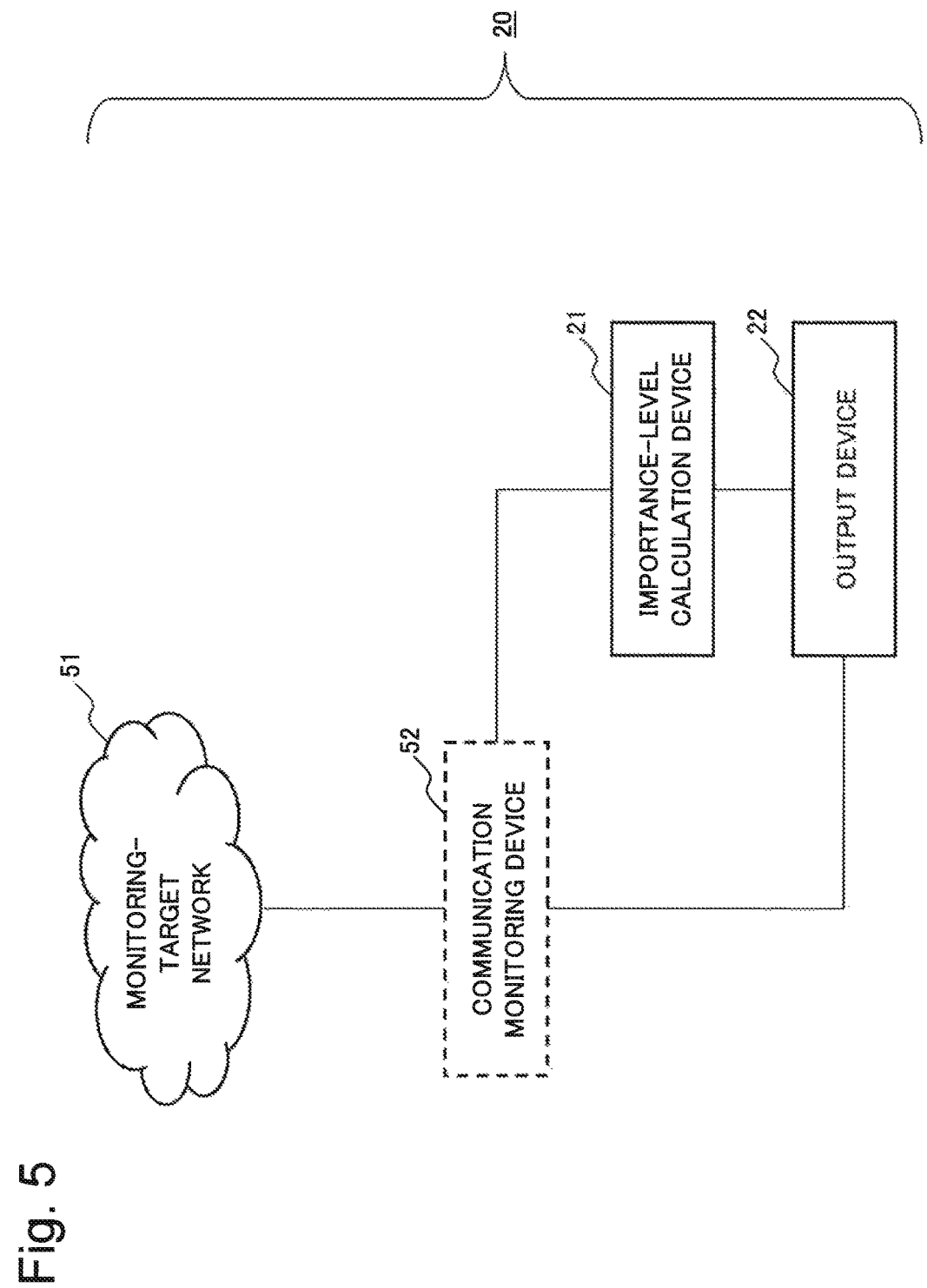
FIG. 5 is a block diagram representing a configuration of a communication monitoring system according to the second example embodiment of the present invention.
Figure 6:
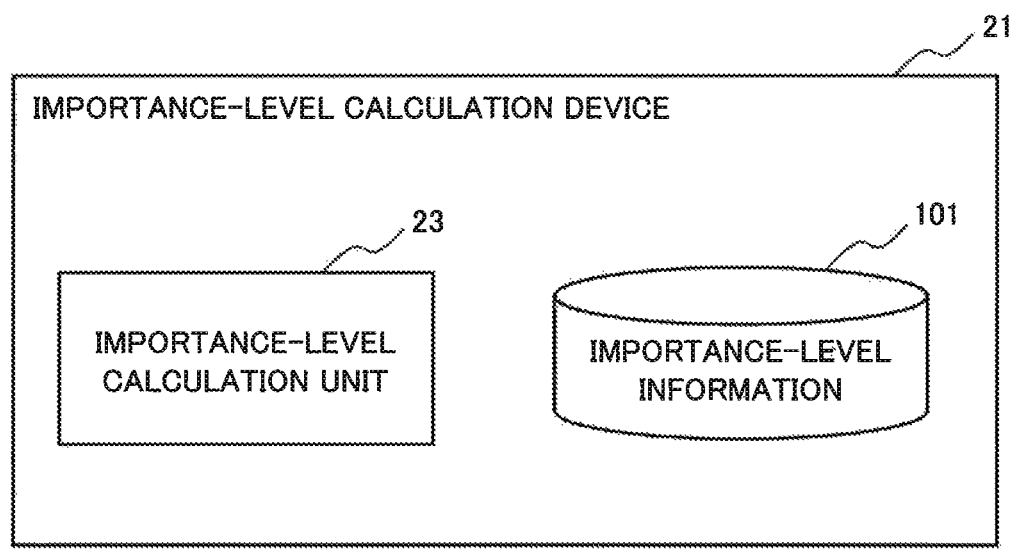
FIG. 6 is a block diagram illustrating a configuration of an importance-level calculation device according to the second example embodiment of the present invention.

FIG. 5 is a block diagram representing a configuration of the communication monitoring system 20 according to the second example embodiment of the present invention. FIG. 6 is a block diagram illustrating a configuration of an importance-level calculation device 21 according to the second example embodiment of the present invention.

In FIG. 5, the communication monitoring system 20 broadly includes the importance-level calculation device 21, an output device 22, the monitoring-target network 51, and the communication monitoring device 52. In FIG. 6, the importance-level calculation device 21 includes an importance-level calculation unit 23.

The importance-level calculation unit 23 explained in the present example embodiment is different from the importance-level calculation unit 2 in the configuration of obtaining the importance level of the alert, for example, based on the originality of the histogram formed based on the payload.

In the following explanation, the operation of the importance-level calculation device 21 according to the present example embodiment is explained in greater detail.

Figure 7:
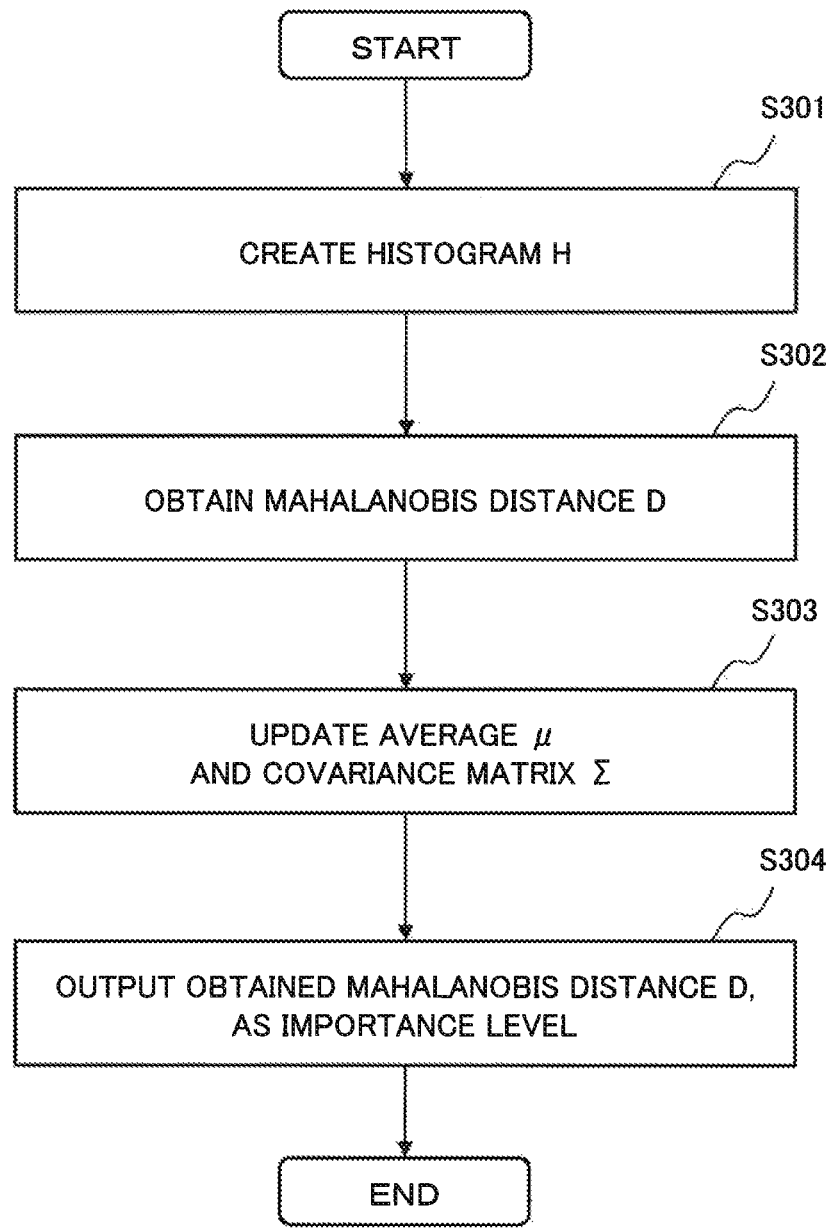
FIG. 7 is flowchart representing operation process of an importance level, which is performed by the importance-level calculation device according to the second example embodiment of the present invention.

FIG. 7 is flowchart representing operation process of the importance level, which is performed by the importance-level calculation device 21 according to the second example embodiment of the present invention. The operational procedure performed by the importance-level calculation device 21 is explained according to the flowchart.

For facilitating the explanation, the importance-level calculation unit 23 is assumed to perform operation process on the basis of the information (e.g., a payload of a communication packet) included in the communication information (e.g., a communication packet) that has caused the first alert and according to the flowchart illustrated in FIG. 7, as an example.

For facilitating the explanation, the importance-level calculation device 21 will be explained by way of the above-described configuration. However, the present invention explained by way of the present example embodiment is not limited to the above-described configuration (hereinafter, the same applies to the following example embodiments).

The importance-level calculation unit 23 computes the importance level of the alert based on a Mahalanobis distance representing a distance between the histogram formed based on the communication information and the average $\mu$ (average value vector) of histograms formed based on the pieces of past communication information related to the second alerts.

More specifically, the importance-level calculation unit 23 first creates a histogram H based on the payload for the alert. That is, the importance-level calculation unit 23 creates the histogram H representing the number of times of appearance of the characters included in the payload (Step S301). For example, this histogram H can be represented as a vector in 256 dimensions.

The importance-level calculation unit 23 computes the Mahalanobis distance D based on the average $\mu$ of the histograms and the covariance matrix $\Sigma$ observed so far (Step S302). The importance-level calculation unit 23 updates the average $\mu$ and the covariance matrix $\Sigma$, using the created histogram H (Step S303). The importance-level calculation unit 23 provides a Mahalanobis distance D computed in Step S302, as the importance level (Step S304).

If the inverse matrix of the covariance matrix $\Sigma$ cannot be calculated, the Mahalanobis distance D cannot be computed. In addition, when the variance being a diagonal component is extremely small, the value of the Mahalanobis distance D has a possibility of changing extremely in response to the increase and decrease of the appearance number of times of characters. In view of this, when the variance of the $K^{th}$ component is smaller than the threshold value $\theta$ ($\theta$ being a real number) set in advance, the threshold value $\theta$ is to be set to the corresponding diagonal component $\Sigma$ (K, K) of the covariance matrix. Here K is a natural number. Furthermore, the component corresponding to the covariance with the $K^{th}$ component is to be set to 0. Accordingly, the importance-level calculation unit 23 can compute the Mahalanobis distance D even under the above-described condition.

The output device 22 has a function of presenting at least any of the computed importance level and a part or all of and the alert information related to the alert. That is, the output device 22 outputs various types of information related to alerts in a mode in which the operator can identify the information, for example.

FIG. 8 is a diagram specifically illustrating a mode in which information related to the alert is presented by the output device 22 according to the second example embodiment of the present invention.

More specifically, the output device 22 outputs, for each alert, at least a part of the items included in alert information and the importance level of the alert, as illustrated in FIG. 8. That is, the output device 22 outputs, in the user interface which the output device 22 constitutes, a part of the items included in alert information and the importance level of the alert.

FIG. 8 illustrates a detected alert list 61 presented by the output device 22. In the detected alert list 61 illustrated in a table format in FIG. 8, the first column represents the detection time. The second column represents the IP address of the transmission source host of communication information. The third column represents the IP address of the transmission destination host of the communication information. The fourth column represents the name of the detection rule, as the identifier by which the detection rule can be identified (detection rule name). The fifth column represents the importance level of the alert information In the above-described present example embodiment, for facilitating the explanation, the detected alert list 61 illustrated in FIG. 8 is explained by way of a configuration of presenting a part of information included in alert information and an importance level. However, the example embodiment of the present invention is not limited to the described configuration. The output device 2 may take a configuration of presenting various types of information such as a port number of a transmission source host, in response to an operator's request.

The detected alert list 61 illustrated in FIG. 8 is explained by taking an example of a configuration of outputting the importance level in a numerical value. However, the example embodiment of the invention is not limited to the described configuration. The output device 2 may output these types of information, in a display mode by which the visibility is heightened, for example by changing the displayed color or displaying by a bar graph depending on the value of the importance level. By doing so, an operator can pay more attention to greater values of importance level, and can efficiently classify the alerts. In addition, the output device 22 may output the importance level by changing the pattern of sound or vibration for example, depending on the value of importance level.

The output device 22 may adopt a configuration of outputting an importance level computed by the importance-level calculation unit 2 explained in the first example embodiment and the importance level computed by the importance-level calculation unit 23.

By doing so, no matter how cleverly the attacker incorporates the payload in an attempt to decrease the importance level of the packet for the attack, for example, it is difficult to decrease the two importance levels simultaneously. Therefore, by outputting two importance levels, these importance levels play a complementary role. As a result, the communication monitoring system 20 can decrease the possibility of missing an alert with a high importance level.

In the above-described present example embodiment, for facilitating the explanation, the importance-level calculation device 21 and the output device 22 are configured as a separate body from each other. However, the example embodiment of the present invention is not limited to the described configuration. The importance-level calculation device 21 and the output device 22 may be configured in a same device. In that case, the importance-level calculation device 21 may adopt a configuration of including the output device 2, as an example.

In this way, the importance-level calculation device 21 and the output device 22 according to the present example embodiment can achieve the effect explained in the first example embodiment, as well as being able to output to the operator information related to the alert having a higher accuracy.

This is because the importance-level calculation device 21 includes the importance-level calculation unit 23 that can obtain the importance level of the alert by taking into consideration the correlation between the characters included in the payloads or the variation in number of times of appearance. In addition, the output device 22 can output the computed importance level. Accordingly, the operator can determine the level of risk of the alert depending on the originality of the payload.

Third Example Embodiment

Next, a third example embodiment based on the importance-level calculation device 21 according to the above-described second example embodiment of the present invention is explained. In the following explanation, the characteristic portions of the present example embodiment are mainly explained. In the following explanation, each configuration that is similar to the corresponding configuration of the above-described example embodiments is assigned the same reference number, and the overlapping explanation is omitted.

The communication monitoring system 30 according to the third example embodiment of the present invention is explained with reference to FIG. 9 to FIG. 14.

Figure 9:
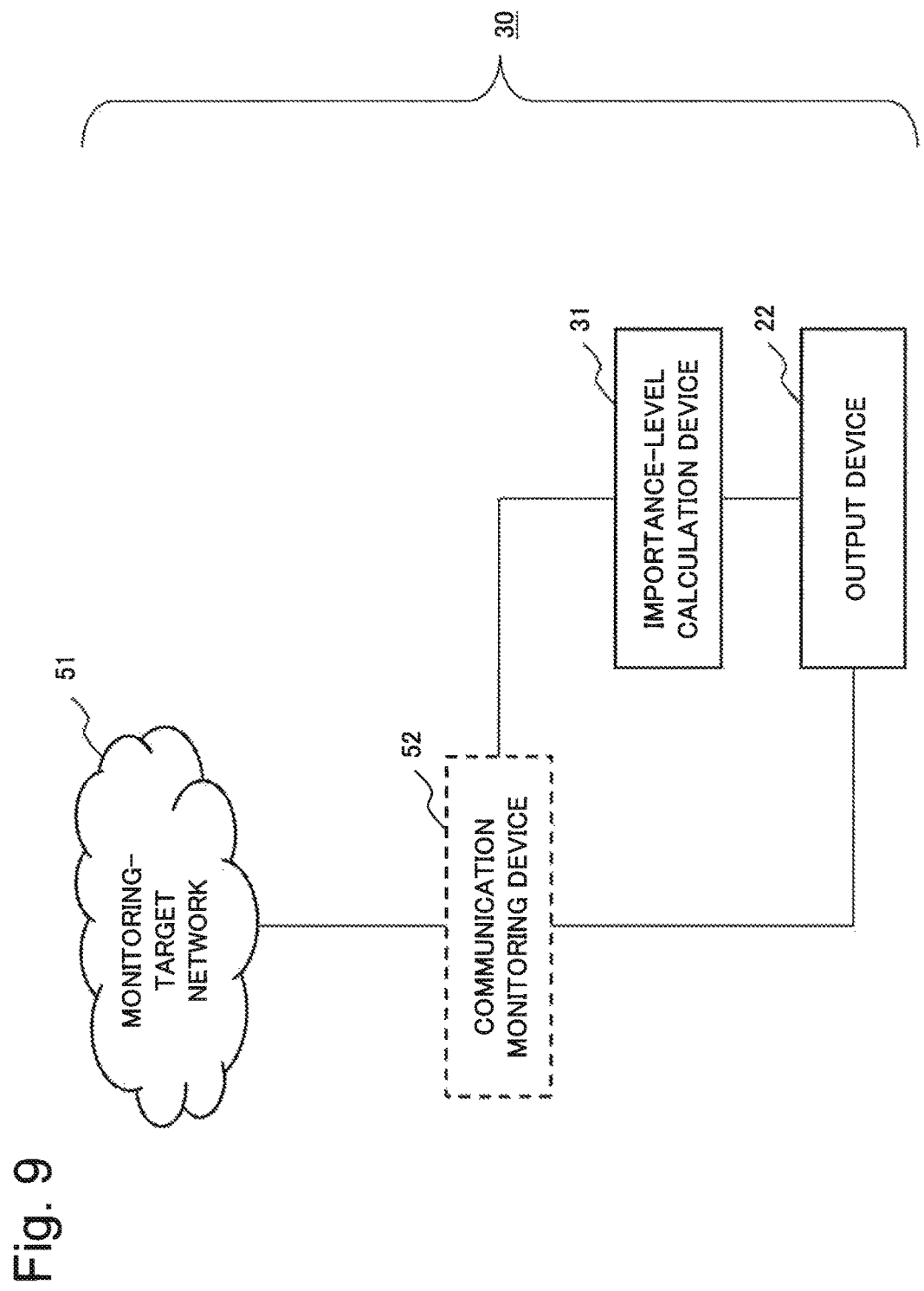
FIG. 9 is a block diagram illustrating a configuration of a communication monitoring system according to the third example embodiment of the present invention.
Figure 10:
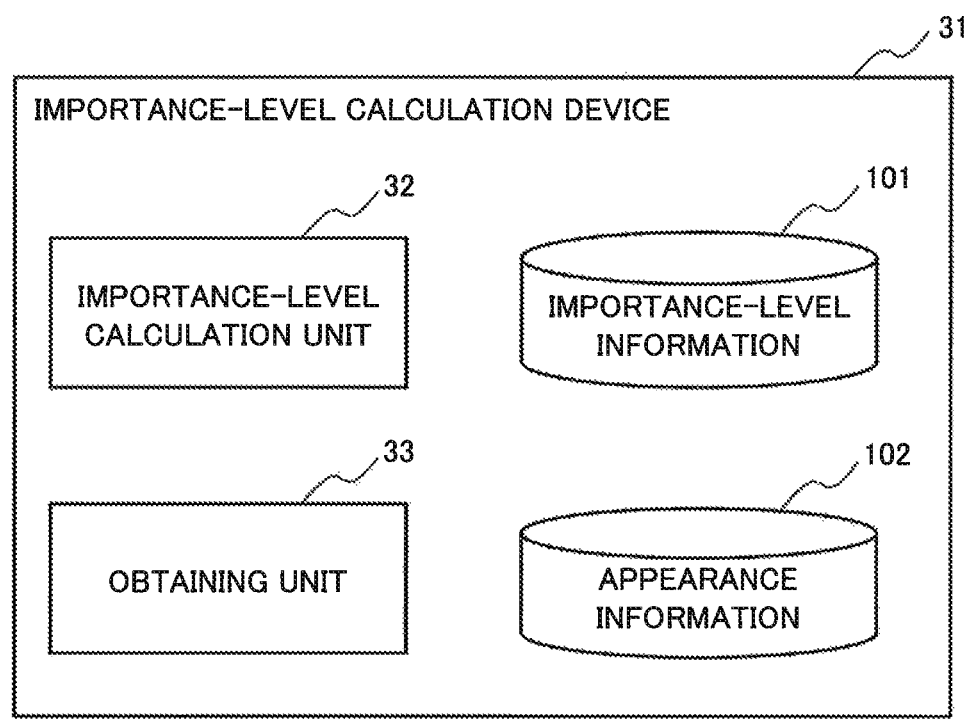
FIG. 10 is a block diagram illustrating a configuration of an importance-level calculation device according to the third example embodiment of the present invention.

FIG. 9 is a block diagram illustrating a configuration of a communication monitoring system 30 according to the third example embodiment of the present invention. FIG. 10 is a block diagram illustrating a configuration of an importance-level calculation device 31 according to the third example embodiment of the present invention.

In FIG. 9, the communication monitoring system 30 broadly includes the importance-level calculation device 31, the output device 22, the monitoring-target network 51, and the communication monitoring device 52. In FIG. 10, the importance-level calculation device 31 includes an importance-level calculation unit 32 and an obtaining unit 33.

The importance-level calculation unit 32 explained according to the present example embodiment is the same as the importance-level calculation unit 2 explained in the first example embodiment, in the configuration of determining the importance level of the alert, based on the N-gram having appeared in the payload. However, the importance-level calculation unit 32 is different from importance-level calculation unit 2 in the configuration of obtaining the importance level by considering the time at which the N-gram appeared in the past. In the present example embodiment, the appearance information 102 not illustrated in the first example embodiment is explained.

First, the following explains the appearance information 102. The appearance information 102 retains appearance information of N-grams. The appearance information 102 retains the N-gram having appeared and the appearance time representing the time at which the N-gram appeared, in association with each other. That is, the appearance information 102 retains an N-gram and a latest (current) appearance time at which the N-gram appeared, in association with each other.

The obtaining unit 33 has a function of obtaining, from the communication monitoring device 52, alert information and payload information retained in the alert information 103 and the payload information 104 that are detailed later, in the order of detection time.

In the following explanation, the operation of the importance-level calculation device 31 according to the present example embodiment is explained in greater detail.

Figure 11:
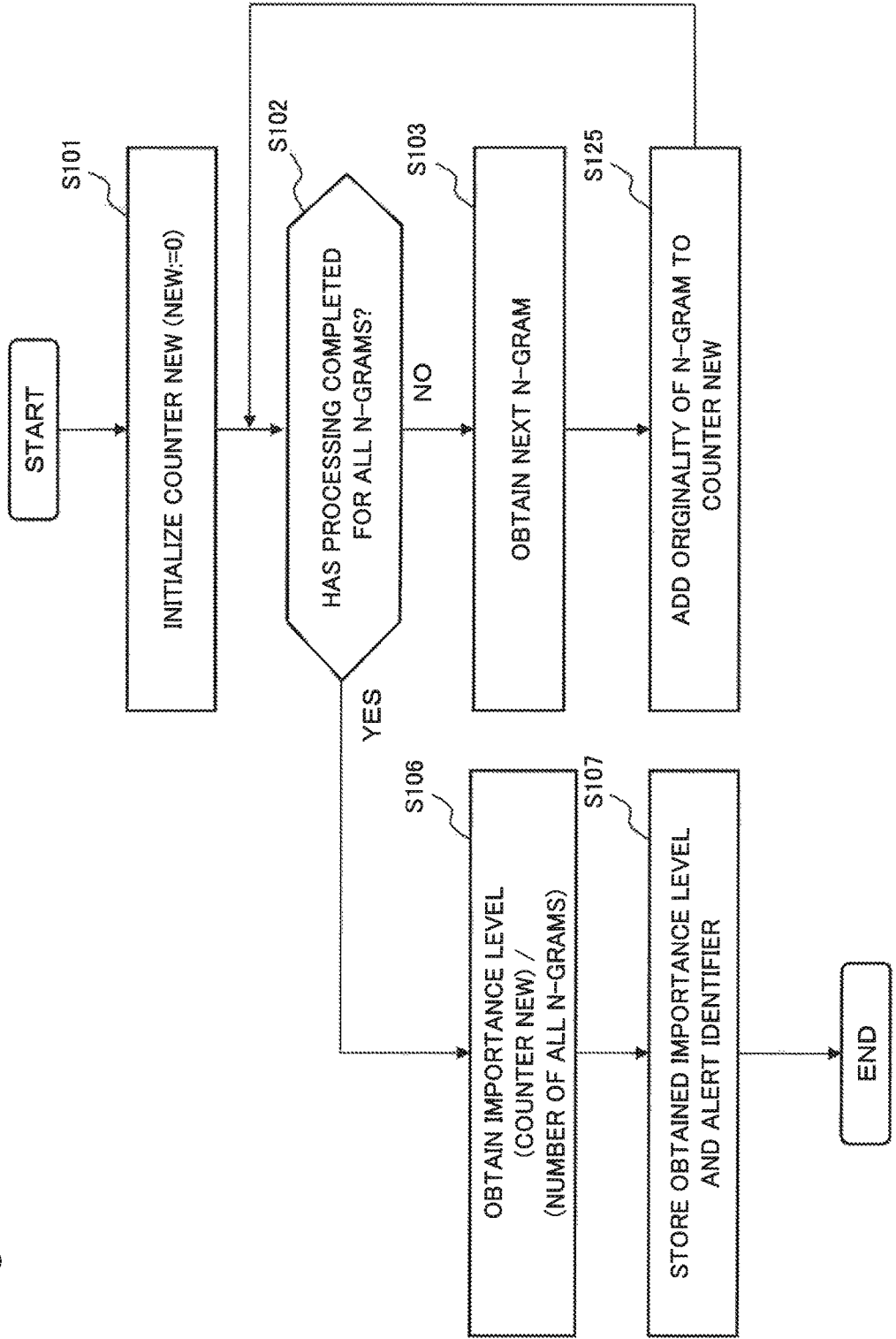
FIG. 11 is flowchart representing operation process of an importance level, which is performed by the importance-level calculation device according to the third example embodiment of the present invention.

FIG. 11 is flowchart representing operation process of the importance level, which is performed by the importance-level calculation device 31 according to the third example embodiment of the present invention. The operational procedure performed by the importance-level calculation device 31 is explained according to the flowchart.

In the present example embodiment, for facilitating the explanation, the importance-level calculation device 31 is assumed to perform operation process on the basis of the information (e.g., a payload of the communication packet) included in the communication information (e.g., the communication packet) that has caused the first alert and according to the flowchart illustrated in FIG. 11, for example.

For facilitating the explanation, the importance-level calculation device 31 will be explained by way of the above-described configuration. However, the present invention explained by way of the present example embodiment is not limited to the above-described configuration.

In the following explanation, each configuration that is similar to the corresponding configuration of the first example embodiments is assigned the same reference number, and the overlapping explanation is omitted.

More specifically, the importance-level calculation device 31 computes the originality of the first N-gram having obtained in Step S103. The importance-level calculation device 31 adds the obtained originality to the counter NEW (Step S125).

The importance-level calculation device 31 may compute an importance level X2 by the following expression (2) based on the counter NEW to which the originality is added and the number of all the N-grams, in Step S106, which is specifically illustrated in the following expression.

$$X2=(\text{Counter NEW})/(\text{The number of all the } N\text{-grams}) \quad (2)$$

In this way, the importance-level calculation device 31 computes the average value of the originality as the importance level.

In the following explanation, the operation of the importance-level calculation device 31 to obtain an originality is explained in greater details.

The importance-level calculation device 31 obtains the appearance time associated with the first N-gram obtained in Step S103, from the appearance information 102. That is, the importance-level calculation device 31 obtains the appearance time closest to the current time (immediate appearance time) from the appearance information 102. In other words, the importance-level calculation device 31 obtains the appearance time at which the second N-gram that is the same as the first N-gram having appeared in the past.

The importance-level calculation device 31 computes the elapsed time $\Delta$ from the obtained appearance time to the detection time at which the abnormality is detected. In that case, the importance-level calculation device 31 may realize the detection time by obtaining it from alert information 103 later described.

The importance-level calculation device 31 computes the originality so that a greater value of originality is obtained when the elapsed time $\Delta$ is greater, and so that the originality has an upper limit. More specifically, in calculation of the originality, $(1-\text{power}(K, \Delta))$ can be used for a constant K which is smaller than 1, for example. However, the calculation method of the originality is not limited to this. Any function of elapsed time $\Delta$ that satisfies the above-stated condition may be used, in calculating the originality. Here, "−" represents subtraction, and "power(K, $\Delta$)" represents the $\Delta^{th}$ power of K.

However, when there is no appearance time associated with the first N-gram in the appearance information 102, the elapsed time $\Delta$ is represented as $\Delta=\infty$.

In this way, the importance-level calculation device 31 computes originality based on the first N-gram and the elapsed time from the appearance time at which the second N-gram that is the same as the first N-gram appeared, to the detection time at which the abnormality is detected. Then, the importance-level calculation device 31 can compute the importance level based on the computed originality and the number of all the N-grams. That is, the importance-level calculation device 31 can obtain an average value of an originality as the importance level. Other word the importance-level calculation device 31 obtains the importance level, based on originalities for all first N-grams included in the communication information and the number of all the first N-grams. The importance-level calculation device 31 obtains the originality of the first N-gram based on an elapsed time from an appearance time at which the first N-gram being the same as second N-grams having appeared in the past to a detection time at which the abnormality is detected.

After obtaining the importance level, the importance-level calculation device 31 stores, as appearance information 102, the first N-gram having appeared and the appearance time at which the first N-gram appeared, in association with each other. Note that the process to store the appearance information is the same as that in the first example embodiment. Therefore, the detailed explanation is omitted.

Figure 12:
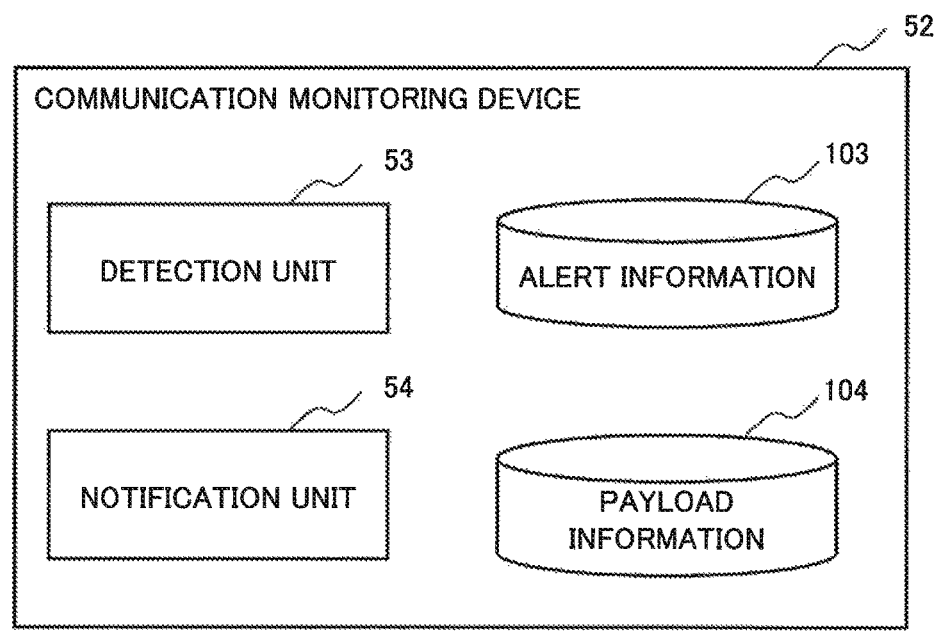
FIG. 12 is a block diagram illustrating a configuration of a communication monitoring device according to the third example embodiment of the present invention.

In the following explanation, the communication monitoring device 52 is described with reference to FIG. 12. FIG. 12 is a block diagram illustrating a configuration of the communication monitoring device 52 according to the third example embodiment of the present invention.

In FIG. 12, the communication monitoring device 52 includes a detection unit 53 and a notification unit 54. The alert information 103 and the payload information 104 are assumed to be stored in a storage device not illustrated in the drawing.

The detection unit 53 has a function of monitoring the communication packet flowing through the network 51. More specifically, the detection unit 53 detects the abnormality such as the attack from outside and directed to the network 51 on the basis of the detection rule, for example. Then, in response to detecting the attack, the detection unit 53 stores alert information in the alert information 103. In addition, the detection unit 53 stores the payload included in the communication packet, in the payload information 104.

In the present example embodiment, the alert information 103 includes, for each alert, information in which the detection time, the identifier of the detection rule, the IP address and the port number of the transmission source, and the IP address and the port number of the transmission destination host are associated with each other, by using the alert identifier as a key.

The payload information 104 includes, for each alert, information in which the alert identifier and the payload are associated with each other. That is, the payload information 104 is stored in a state associated with correspondence relation between the payload and the alert information retained in the alert information 103.

When the detection unit 53 detects the attack, the notification unit 54 notifies the importance-level calculation device 31 of the alert indicating the detection.

Figure 13:
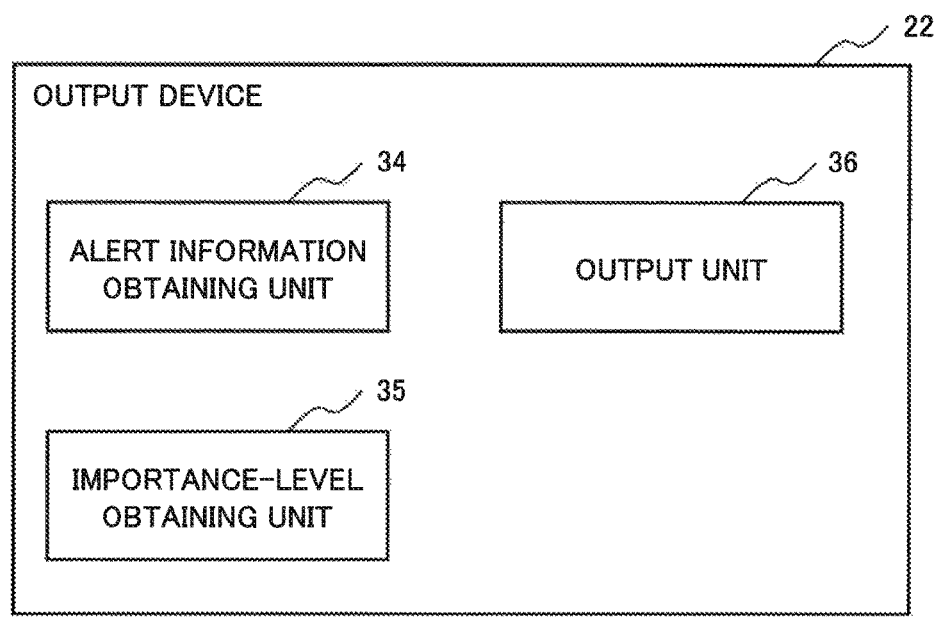
FIG. 13 is a block diagram illustrating a configuration of a output device according to the third example embodiment of the present invention.

In the following explanation, the output device 22 is explained with reference to FIG. 13. FIG. 13 is a block diagram illustrating a configuration of the output device 22 according to the third example embodiment of the present invention.

In FIG. 13, the output device 22 includes an alert information obtaining unit 34, an importance-level obtaining unit 35, and a output unit 36.

The output device 22 has a function of presenting the importance level of an alert along with alert information to the operator for example.

More specifically, the alert information obtaining unit 34 has a function of obtaining the alert information that matches a search condition from the alert information retained in the alert information 103.

The importance-level obtaining unit 35 has a function of obtaining, from the importance-level information 101, the importance level that matches the alert identifier included in the alert information obtained by the alert information obtaining unit 34.

In the above-described present example embodiment, for facilitating the explanation, the alert information obtaining unit 34 and the importance-level obtaining unit 35 have a configuration of obtaining information, for example. However, the example embodiment of the present invention is not limited to the described configuration. The alert information obtaining unit 34 and the importance-level obtaining unit 35 may adopt such a configuration of being provided with the information in response to a request.

The output unit 36 has a function of presenting the alert information obtained by the alert information obtaining unit 34 together with the importance level obtained by the importance-level obtaining unit 35.

In the following explanation, the operation of the communication monitoring system 30 according to the present example embodiment is explained in greater details.

Figure 14:
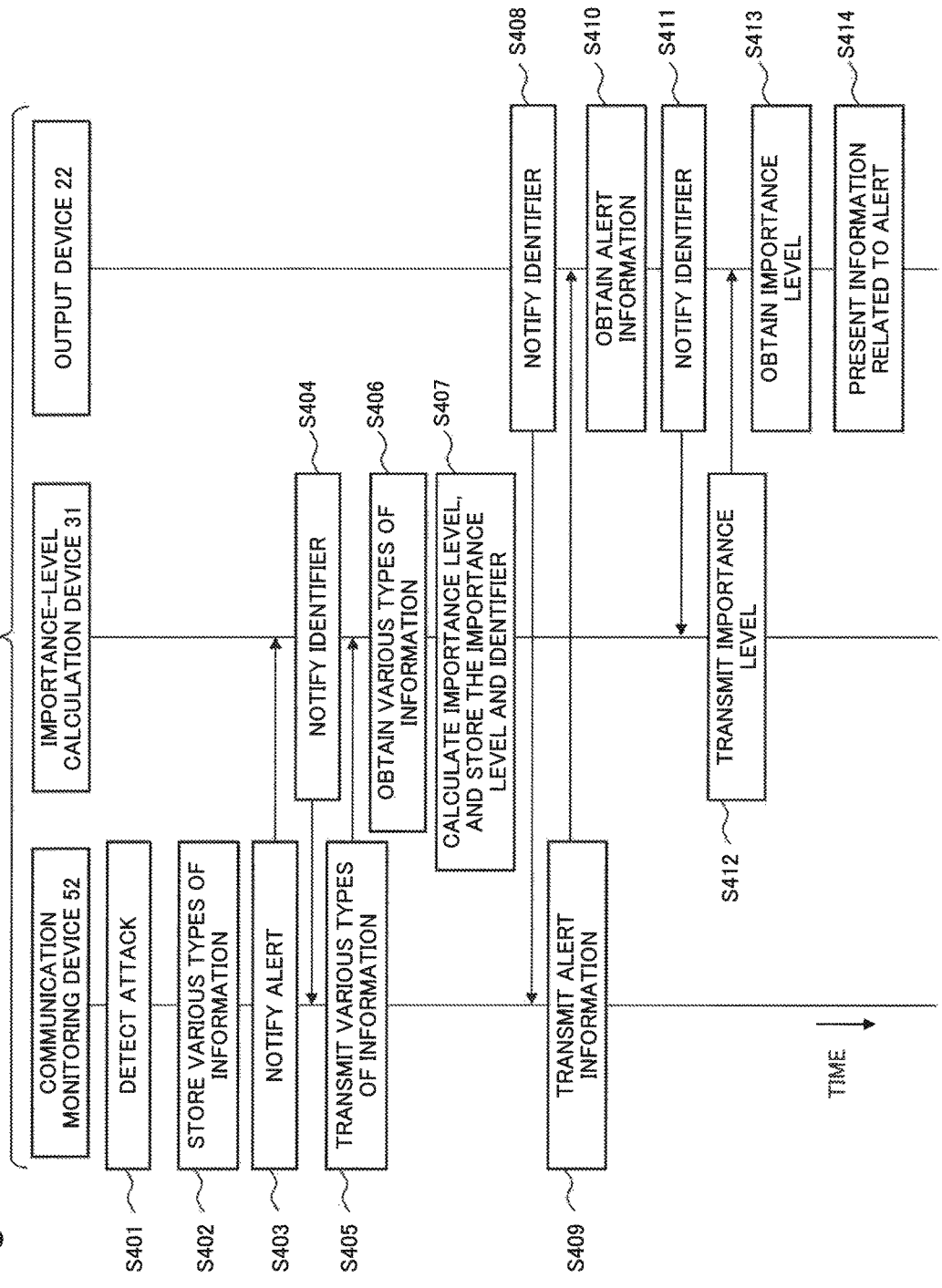
FIG. 14 is a sequence diagram (flowchart) illustrating an operation performed by the communication monitoring system according to the third example embodiment of the present invention.

FIG. 14 is a sequence diagram (flowchart) illustrating an operation performed by the communication monitoring system 30 according to the third example embodiment of the present invention. The operational procedure of the communication monitoring system 30 is explained according to the flowchart The detection unit 53 of the communication monitoring device 52 detects the attack to the network 51 on the basis of the detection rule (Step S401). In response to detection of the attack, the detection unit 53 stores alert information in the alert information 103. In addition, the detection unit 53 stores, in the payload information 104, the payload included in the communication packet that has caused the alert (Step S402).

When the detection unit 53 detects the attack, the notification unit 54 of the communication monitoring device 52 notifies the importance-level calculation device 31 of the newly detected abnormality. That is, the notification unit 54 notifies the importance-level calculation device 31 of the alert (Step S403).

The importance-level calculation device 31 receives the alert notified by the notification unit 54. The obtaining unit 33 of the importance-level calculation device 31 obtains the alert information included in the alert information 103 and the payload included in the payload information 104.

In that case, the alert information to be obtained may be configured to obtain all the alert information on and after the designated time. The alert information to be obtained may also be configured to be obtained by the following process. That is, the notification unit 54 notifies the obtaining unit 33 of the alert identifier of the alert to be newly notified. The obtaining unit 33, in obtaining the alert information, may obtain the alert information by designating the alert identifier notified by the notification unit 54. Alternatively, in Step S403 in FIG. 14, the notification unit 54 may notify an alert by including therein alert information and the payload, when notifying the importance-level calculation device 31 of the alert. The obtaining unit 33 may accordingly obtain the alert information and the payload information included in the notified alert.

More specifically, the obtaining unit 33 notifies the communication monitoring device 52 of the alert identifier of the alert, for example (Step S404). The communication monitoring device 52 includes, in the response, the alert information and the payload obtained based on the notified alert identifier. The communication monitoring device 52 transmits the response to the obtaining unit 33 (Step S405). The obtaining unit 33 obtains the alert information and the payload. In addition, the obtaining unit 33 provides the importance-level calculation unit 32 with the obtained alert information and payload, as an input (Step S406).

The importance-level calculation unit 32, upon receiving the alert information and the payload as an input, calculates the importance level. In addition, the importance-level calculation unit 32 stores, as importance level information 101, the calculated importance level and the alert identifier included in the alert information in association with each other (Step S407).

The output device 22 starts process, when triggered by the operator's operation. That is, the alert information obtaining unit 34 of the output device 22 obtains alert information from the alert information 103. Further, the importance-level obtaining unit 35 of the output device 11 obtains, from the importance-level information 101, the importance level associated with the alert identifier, based on the alert identifier included in the obtained alert information.

More specifically, the alert information obtaining unit 34 notifies the communication monitoring device 52 of the alert identifier of the notified alert, for example (Step S408). The communication monitoring device 52 includes, in the response, the alert information obtained based on the notified alert identifier. The communication monitoring device 52 transmits the response to the alert information obtaining unit 34 (Step S409). The alert information obtaining unit 34 obtains the alert information (Step S410).

The importance-level obtaining unit 35 notifies the importance-level calculation device 31 of the alert identifier included in the obtained alert information (Step S411). The importance-level calculation device 31 includes, in the response, the importance level obtained based on the notified alert identifier. The importance-level calculation device 31 transmits the response to the importance-level obtaining unit 35 (Step S412). The importance-level obtaining unit 35 obtains the importance level (Step S413). The output unit 36 presents, to the operator, the obtained alert information and importance level (Step S414).

In this way, the importance-level calculation device 31 and the output device 22 according to the present example embodiment can achieve the effect explained in each of the example embodiments, as well as being able to present to the operator information related to the alert having a higher accuracy.

This is because the importance-level calculation device 31 includes the importance-level calculation unit 32 that computes the importance level of the alert, by using the originality of the N-gram computed based on the elapsed time from the immediate appearance time to the detection time at which an abnormality is detected. The elapsed time is an approximate value of the average appearance interval in the N-gram. That is, the importance level computed by the importance-level calculation unit 32 can be said to be the importance level computed based on the appearance frequency of the N-gram.

For example, the importance level obtained in the first example embodiment has a possibility that its average value decreases as the elapse of time. This is because the N-grams having appeared will monotonically increase as the elapse of time. In contrast, the importance-level calculation device 31 can use the elapsed time to restrain decrease in importance level due to the effect of the N-gram having appeared in the past but not after that.

Hardware Configuration Examples

Each unit illustrated in the drawings related to the above-described example embodiment can be interpreted as a functional unit of a software program (processing unit, software module). Each of these software modules may be realized by dedicated hardware. However, classification of each unit illustrated in these drawings is a configuration for facilitating the explanation, and various configurations can be considered in implementation. An example hardware environment in this case is explained with reference to FIG. 15. Note that the directions of the arrows in FIG. 15 are an example, and do not limit the directions of the signals between the blocks.

Figure 15:
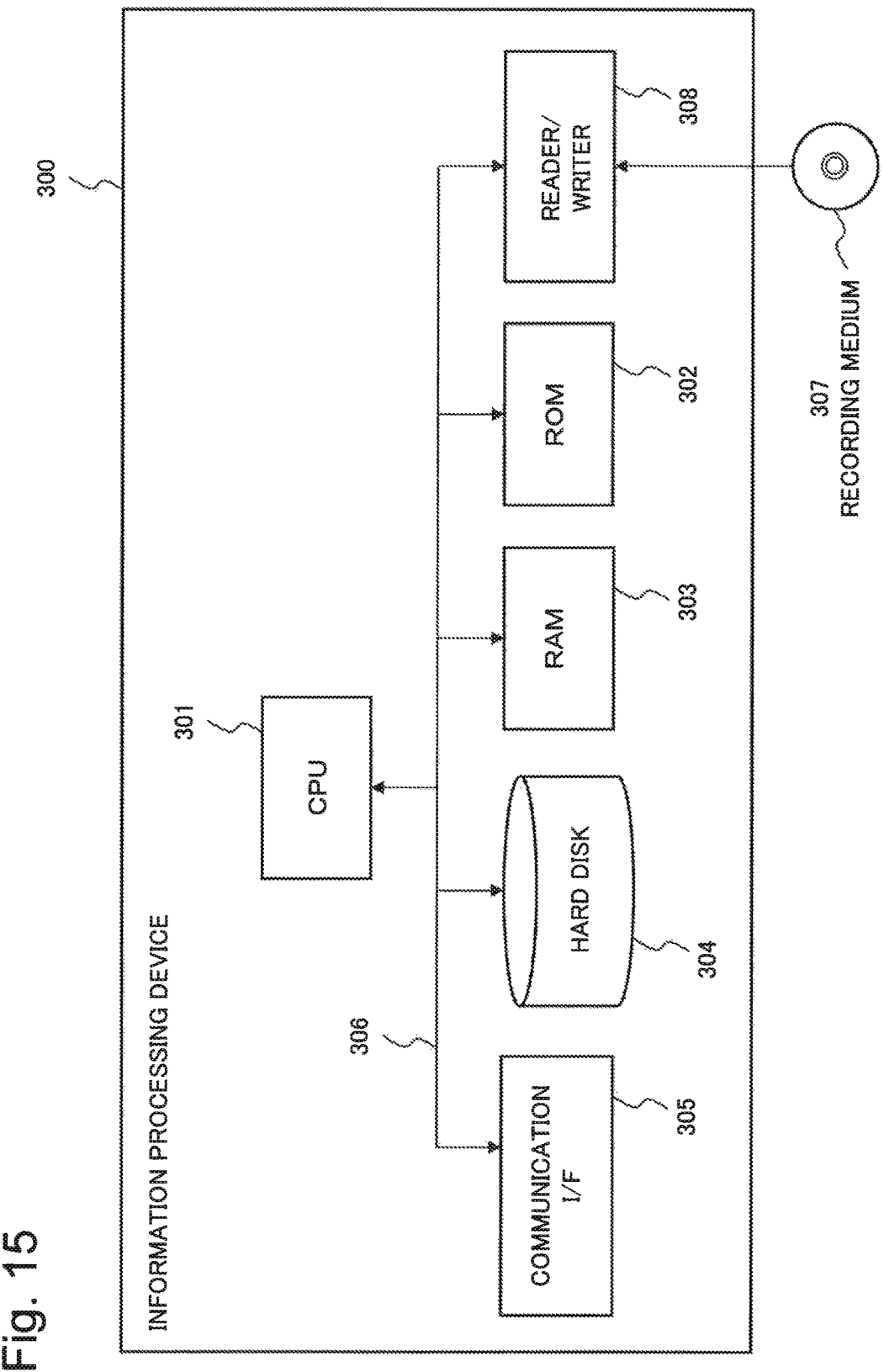
FIG. 15 is a block diagram illustratively explaining a hardware configuration of an information processing device that can realize each example embodiment of the present invention.

FIG. 15 is a diagram illustratively explaining a configuration of an information processing device (computer) 300 that can realize an importance-level calculation device and a output device according to an example embodiment of the present invention. That is, FIG. 15 illustrates a configuration of a computer such as a server (information processing device), which is a hardware environment in which each function in the above-described example embodiments can be realized. This computer can realize all or a part of the importance-level calculation device and the output device of the importance-level calculation device 1 (FIG. 2), the importance-level calculation device 21 (FIG. 5, FIG. 6), the output device 22 (FIG. 5, FIG. 9, and FIG. 13), or the importance-level calculation device 31 (FIG. 9 and FIG. 10).

The information processing device 300 illustrated in FIG. 15 is a typical computer in which the following components are connected via a bus (communication line) 306.

CPU (Central_Processing_Unit) 301
ROM (Read_Only_Memory) 302
RAM (Random_Access_Memory) 303
Hard disk 304 (storage device)
Communication interface with an external device (In FIG. 15, this is illustrated as a communication "I/F" (interface)) 305
Reader/writer 308 that can read and write date stored in the recording medium 307 such as CD-ROM (Compact_Disc_Read_Only_Memory)

The present invention explained by taking the above-described example embodiments as examples can be realized by the following procedures. That is, a computer program that can realize the functions illustrated in the block configuration diagrams (FIG. 1, FIG. 2, FIG. 5, FIG. 6, FIG. 9, FIG. 10, FIG. 13) or the flowcharts (FIG. 3, FIG. 4, FIG. 7, FIG. 14) which are referred to in the respective example embodiments is supplied to the information processing device 300 illustrated in FIG. 15. Thereafter, the computer program is read and executed by the CPU 301 of the hardware, thereby realizing the present invention. In addition, the computer program supplied in that device may be stored in a non-volatile storage device such as readable/writable transitory storage memory (RAM 303) or a hard disk 304.

In the former case, a currently common procedure can be adopted as a method of supplying a computer program to the hardware. For example, the supply method may be a method of installation in the device via various types of recording media 307 such as CD-ROM, and a method of downloading from outside via a communication line such as the Internet. In such cases, the present invention can be interpreted as being configured by a code constituting such a computer program or a recording medium in which such a code is stored.

So far, the present invention has been explained by way of the example embodiments. However, the present invention is not limited to the above-described example embodiments. Various changes which can be understood by those skilled in the art can be made to the configuration and the details of the present invention within the scope of the present invention.

The present application claims priority of Japanese Patent Application No. 2014-249567 filed on Dec. 10, 2014, the entire disclosure of which is incorporated herein.

REFERENCE SIGNS LIST

1 Importance-level calculation device
2 Importance-level calculation unit
10 Communication monitoring system
20 Communication monitoring system
21 Importance-level calculation device
22 Output device
23 Importance-level calculation unit
30 Communication monitoring system
31 Importance-level calculation device
32 Importance-level calculation unit
33 Obtaining unit
34 Alert information obtaining unit
35 Importance-level obtaining unit
36 Output unit
51 Network
51 Monitoring-target network
52 Communication monitoring device
53 Detection unit
54 Notification unit
61 detected alert list
101 Importance-level information
102 Appearance information
103 Alert information
104 Payload information
300 Information processing device
301 CPU
302 ROM
303 RAM
304 Hard disk
305 Communication interface
306 Bus
307 Recording medium
308 Reader/writer

What is claimed is:

1. An importance-level calculation device comprising:
a memory storing instructions; and
a processor to execute the instructions to compute when a first alert is notified in response to detection of an abnormality in a communication network to be monitored, an importance level of the first alert, based on a characteristic that is included in communication information that has caused the first alert but is not included in communication information related to one or more second alerts having been notified prior to the first alert; wherein
the processor obtains the importance level, based on originalities for all first N-grams included in the communication information and the number of all the first N-grams, and the importance-level calculation means obtains the originality of the first N-gram based on an elapsed time from an appearance time at which the first N-gram being the same as second N-gram having appeared in the past to a detection time at which the abnormality is detected.

2. The importance-level calculation device as set forth in claim 1, wherein
the processor determines, for all first N-grams included in the communication information, whether the first N-gram is the same as any second N-gram appeared in the past, and computes the importance level based on a result of the determination.

3. The importance-level calculation device as set forth in claim 1, wherein
the processor obtains the importance level, based on a distance between a histogram formed based on the communication information and the average of histograms formed based on pieces of communication information related to the second alerts.

4. The importance-level calculation device as set forth in claim 1, wherein the processor outputs at least any of the computed importance level and a part or all of alert information related to the alert, in a mode in which an operator can identify it.

5. The importance-level calculation device as set forth in claim 4, wherein
the alert information at least includes information in which, an alert identifier from which alert is identifiable, a detection time at which the abnormality is detected; a detection rule used in detecting the abnormality, an IP address and a port number of a transmission source host of communication information that has caused the alert, and an IP address and a port number of a transmission destination host of the communication information, are associated with each other.

6. A non-transitory computer-readable medium storing a computer program making a computer realize a function of:
computing, when a first alert is notified in response to detection of an abnormality in a communication network to be monitored, an importance level of the first alert, based on a characteristic that is included in communication information that has caused the first alert but is not included in communication information related to one or more second alerts having been notified prior to the first alert; wherein
when computing the importance level, obtaining the importance level, based on originalities for all first N-grams included in the communication information and the number of all the first N-grams, and the importance-level calculation means obtains the originality of the first N-gram based on an elapsed time from an appearance time at which the first N-gram being the same as second N-grams having appeared in the past to a detection time at which the abnormality is detected.

* * * * *